(12) United States Patent
Hodes et al.

(10) Patent No.: US 7,617,139 B2
(45) Date of Patent: Nov. 10, 2009

(54) INVESTMENT TRANSACTION STRUCTURE IN WHICH ONE PARTY MAY SUBSTITUTE ONE INVESTMENT FOR ANOTHER

(75) Inventors: Joel C. Hodes, New York, NY (US); John A. Roberts, Congers, NY (US)

(73) Assignee: Morgan Stanley, New York, NY (US)

( * ) Notice: Subject to any disclaimer, the term of this patent is extended or adjusted under 35 U.S.C. 154(b) by 546 days.

(21) Appl. No.: 11/087,460

(22) Filed: Mar. 23, 2005

(65) Prior Publication Data
US 2005/0234795 A1 Oct. 20, 2005

Related U.S. Application Data

(60) Provisional application No. 60/555,618, filed on Mar. 23, 2004.

(51) Int. Cl.
*G06Q 40/00* (2006.01)
(52) U.S. Cl. .......................................... 705/35
(58) Field of Classification Search .................. 705/35
See application file for complete search history.

(56) References Cited

U.S. PATENT DOCUMENTS

| | | | |
|---|---|---|---|
| 6,161,121 A * | 12/2000 | Hardy et al. ................. | 718/104 |
| 6,922,677 B1 * | 7/2005 | Sperandeo ................ | 705/36 R |
| 7,143,061 B2 * | 11/2006 | Treynor ..................... | 705/36 R |
| 7,236,955 B2 * | 6/2007 | Sugahara ...................... | 705/37 |
| 7,376,609 B2 * | 5/2008 | Clark et al. ............... | 705/36 R |
| 2003/0093356 A1 * | 5/2003 | Kaufman ...................... | 705/37 |
| 2003/0154153 A1 * | 8/2003 | Steidlmayer et al. .......... | 705/37 |
| 2004/0107157 A1 * | 6/2004 | Bleunven et al. ............. | 705/37 |
| 2004/0236636 A1 * | 11/2004 | Lutnick et al. ................ | 705/26 |
| 2004/0243499 A1 * | 12/2004 | Bateson et al. ................ | 705/35 |
| 2005/0131796 A1 * | 6/2005 | Bridges et al. ............... | 705/36 |
| 2006/0282355 A1 * | 12/2006 | Canezin et al. ............... | 705/35 |

OTHER PUBLICATIONS

Jacobs et al.: Long-Short portfolio Management: An Integrated Approach, Winter 1999, The Journal of Portfolio Management, pp. 23-32.*
MACQuarie: Risk Management: Using short CFD to hedge your share portfolio, 2009, www. macquarie.com.au/mq/prime, pp. 1-2.*
Association of Financial Professionals: Derivative Primer, Dec. 2001, Committee on Investment of Employee Benefits Assets, pp. 1-11.*
Fischer Black, Andre F. Perold, "Theory of Constant Proportion Portfolio Insurance," Journal of Economic Dynamics and Control, vol. 16, Issues 3-4, 1992.
"Master Repurchase Agreement," Exhibit 10.39 to the 10K Statement of Lomas Mortgage USA, Inc., 1995.

* cited by examiner

*Primary Examiner*—Hani Kazimi
*Assistant Examiner*—Bijendra K Shrestha
(74) *Attorney, Agent, or Firm*—K&L Gates LLP (57) ABSTRACT

In one general aspect, the present invention is directed to methods that may comprise the step of a first party entering into at least one derivative contract with a second party. The derivative contract may provide the second party with a short position on a derivative portfolio including one or more securities. Also, the derivative contract may grant a transferable right to substitute individual securities included in the derivative portfolio. This right may be granted to either the first party or the second party, and the right to substitute may transfer between the first party and the second party under certain conditions. In various embodiments, however, only one of the first party and the second party may have the right to substitute at any one time.

16 Claims, 5 Drawing Sheets

INVESTMENT TRANSACTION STRUCTURE IN WHICH ONE PARTY MAY SUBSTITUTE ONE INVESTMENT FOR ANOTHER

CROSS REFERENCE TO RELATED APPLICATIONS

This application claims priority under 35 U.S.C. § 119 to U.S. Provisional Patent Application Ser. No. 60/555,618, filed Mar. 23, 2004, which is incorporated herein by reference.

BACKGROUND

The present invention relates generally to investment transaction structures and, more particularly, to investment transaction structures in which one party may substitute one investment for another.

Investors often seek to hedge their investment risks. Hedging is an investment strategy designed to reduce investment risk by reducing the volatility of an investment portfolio by reducing the risk of loss. For example, when an investor has a "long" position in a stock, e.g., due to physical ownership of the stock, the investor may hedge the risk by simultaneously using call options, put options, short-selling, or futures contracts. Such a hedge can help lock in profits.

SUMMARY

In one general aspect, the present invention is directed to investment transaction structures in which one party has the right to substitute positions in one investment for another. For example, the party having the right of substitution may substitute components on notional positions at its sole discretion. The notional positions may be, for example, part of swap contracts entered into by the party or notes issued by the party. In exchange for this right, that party agrees to pay the other party to the transaction an enhanced rate leg or yield equal to a rate index (e.g., LIBOR, Fed Funds, etc.) plus some spread. The ability to substitute may enable the party who has that right to, for example, cause the performance of the contract/notes to correspond to the performance of securities not included in the notional positions. This ability permits the party with the right of substitution to keep trading positions private in circumstances where disclosure of those positions could hurt the party.

According to methods pertaining to various embodiments of the present invention, a first party may enter into at least one derivative contract with a second party. The derivative contract may provide the second party with a short position on a derivative portfolio including one or more securities. Also, the derivative contract may grant a transferable right to substitute individual securities included in the derivative portfolio. This right may be granted to either the first party or the second party, and the right to substitute may transfer between the first party and the second party under certain conditions. In various embodiments, however, only one of the first party and the second party may have the right to substitute at any one time.

In other embodiments, a derivative contract (such as a swap contract) may provide the second party with a short position on a derivative portfolio including one or more securities. Also, the derivative contract may grant the first party a right to substitute individual securities included in the derivative portfolio.

In another general aspect, the present invention is directed to methods that may be employed in a transaction including a first party with a first subsidiary in a first jurisdiction and a second subsidiary in a second jurisdiction. The effective tax rate of the first jurisdiction may be higher than the effective tax rate of the second jurisdiction. The methods may comprise the step of a second party selling a long note to the first subsidiary. The long note may have a first initial notional value. Also, the long note may expose the first subsidiary to a first series of long and short positions on a portfolio of securities. The methods may also comprise the step of the second party selling a short note to the second subsidiary. The short note may have a second initial notional value that is a fraction of the first initial notional value. Also, the short note may expose the second subsidiary to a second series of long and short positions on the portfolio of securities. The second series of long and short positions may be inverse to the first series of long and short positions. In addition, the second party may be provided with a right to substitute individual securities included in the portfolio.

DESCRIPTION OF THE FIGURES

Embodiments of the present invention are described herein by example in conjunction with the following figures, wherein.

DESCRIPTION

Figure 1:
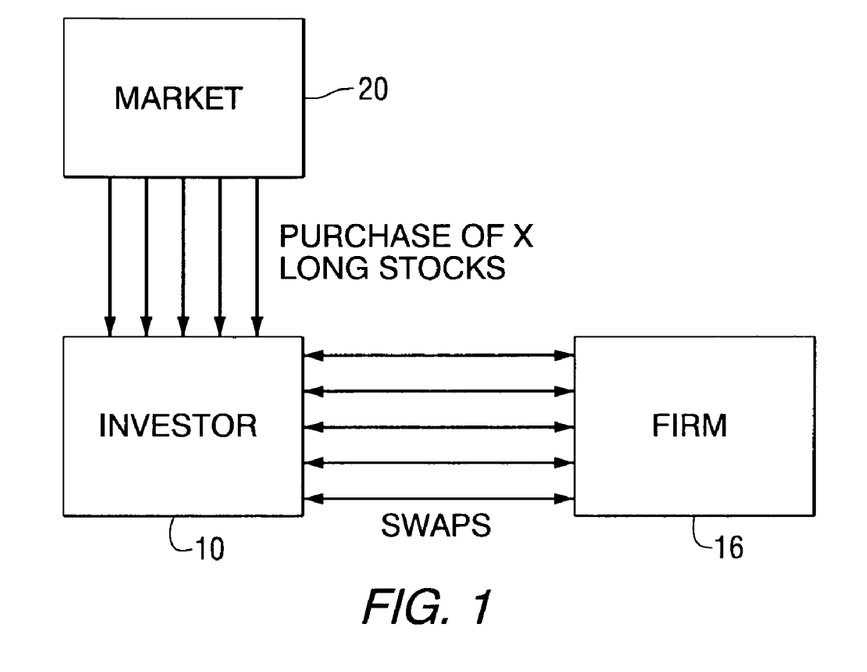
FIGS. 1-3 illustrate a transaction structure according to one embodiment of the present invention.
Figure 2:
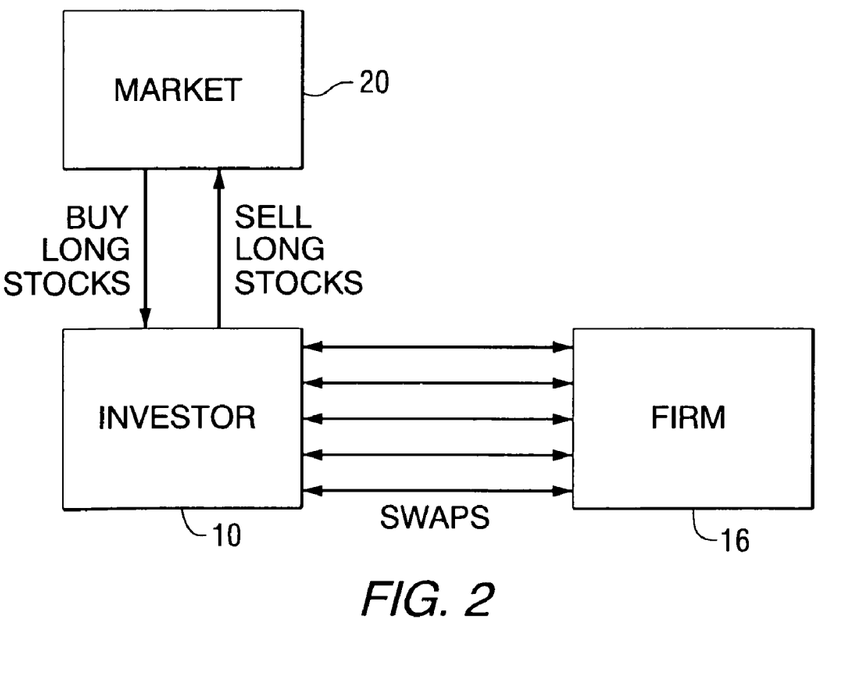
Figure 3:
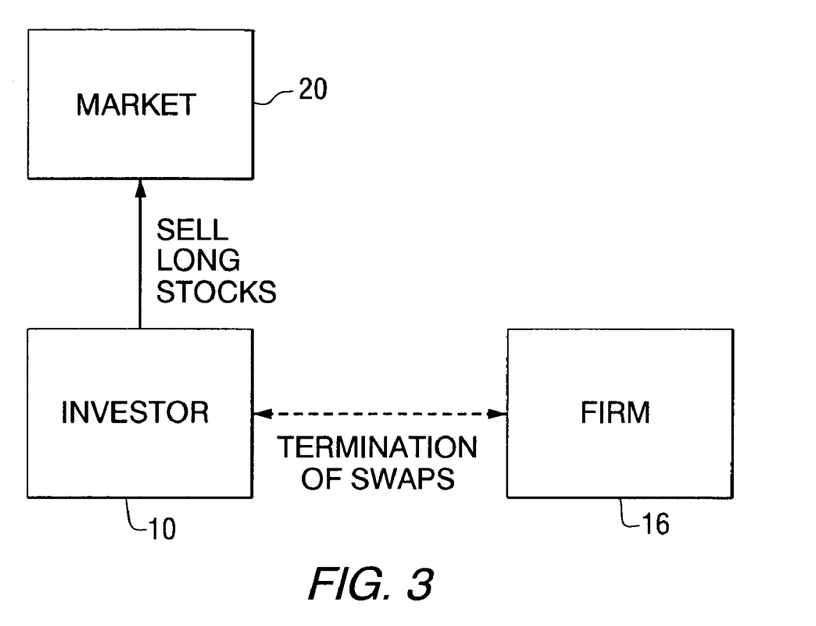

FIGS. 1-3 illustrate an investment transaction structure according to various embodiments of the present invention. For this transaction structure, at the inception, as shown in FIG. 1, an investor 10 may enter into a number of stock pair transactions, each composed of a long physical stock position, purchased from, for example, the market 20 or some individual third party trader, and a short swap position entered into with a firm 16 on a different underlying security. For example, the investor 10 may be an institutional investor and the firm 16 may be a brokerage firm or an investment bank. In various embodiments, the investor 10 may purchase, for example, quantities of thirty different stocks for the long position and enter into thirty derivative contracts (such as swap contracts) for the short position. The initial notional position of the swaps may be some percentage less than the value of the physical stock positions at the inception of the transaction structure.

As discussed in more detail below, the firm 16 may substitute the underlying names in the swap contracts at its own discretion, with the proviso that no underlying names in the swap contracts would correspond to the names (i.e., securities) held by the investor 10 as part of its long positions. In exchange for this right, the firm 16 agrees to pay an enhanced rate leg to the investor 10 of, for example, an interest rate index, e.g., the LIBOR (London Inter-Bank Offer Rate) or the Fed Funds rate, plus some spread (e.g., 100 bps, 150 bps, etc.). The firm 16 may exercise its ability to substitute underlying names in the swap contracts to, for example, achieve the trading goals mentioned below in connection with the transaction structure of FIGS. 6 and 7. In addition, the investor 10 may benefit from the transaction structure as explained below.

The value of the substituted position should be equal to the position for which it is substituted. The value of the position may be based on the price of the underlying securities.

The swap contracts may have a term of, for example, one year, but could be unwound at any time during the term by the investor 10 with sufficient notice, such as one trading day's notice. In other embodiments, the swap contracts may have a term greater than or less than one year. As illustrated in FIG. 2, the investor 10 may, if it so desires, sell some of its initial stock holdings and acquire new stock holdings during the term of the swap contracts. The modified long positions of the investor 10 during the term are communicated to the firm 16, such as via a communication network (not shown), in order that the firm 16 does not include any of the securities comprising the long positions as part of the swaps.

At termination of the swaps, as illustrated in FIG. 3, due either to expiration of the term of the swaps or early termination by the investor 10, the swap contracts may be cash-settled between the investor 10 and the firm 16 based on the current value of the underlying securities, and the long stocks may be sold by the investor 10 into the market 20.

The transaction structure's performance could be monitored daily and, by virtue of the liquidity of the long stocks and the investor's ability to early terminate the swap contracts, the trading strategy's risk could be eliminated quickly in scenarios where the strategy is not performing as anticipated.

In various other embodiments, the transaction structure of FIGS. 1-3 may be used to implement alternative trading methods. For example, the investor 10 may assume long positions on a long portfolio of names, (e.g., stocks, other securities, etc.), having a notional value. The investor 10 may assume the long positions by purchasing the names from the market 20 or another party, or by any other suitable method or transaction.

The investor may also take a short position on a swap portfolio of underlying names through a swap with the firm 16. The swap portfolio may have a notional value that in various embodiments is equal to the notional value of long portfolio. The number of underlying names may be, but does not have to be, equal to the number of names in the long portfolio. In various embodiments, the long and swap portfolios may not have any names in common. It will be appreciated the swap may be couched as one swap on a portfolio of underlying names or as individual swaps for each name in the swap portfolio.

Under the swap contract, the investor 10 may agree to pay the firm 16 appreciation and dividends on the underlying names. The firm 16 may agree to pay the investor 10 depreciation on the underlying names. In various embodiments, the firm 16 may also pay the investor an adjusted interest rate on the initial notional value of the swap, for example, LIBOR or the Fed. Funds rate minus an agreed spread, e.g., 30 b.p. The adjusted rate may be paid on the initial notional value of the swap contract. For the purpose of determining appreciation or depreciation for payment, the underlying names may be valued at their closing price, for example, each day, month, quarter, etc.

The swap contract may also include a right to substitute the underlying names of the swap portfolio. This substitution right may be held by the investor 10 or the firm 16. With the substitution right, an underlying name may be substituted out of the swap portfolio in exchange for a new name of equal value. In various embodiments, the equality of two names may be based on their Volume Weighted Average Prices (VWAP) for the trading day on which the substitution is made. Because payments between the investor 10 and the firm 16 under the swap contract may be determined based on the closing prices of the names on the trading day of the substitution, while substitution values are based on VWAP for that trading day, the party holding the substitution right may profit by strategically substituting names with VWAP's higher or lower than the closing prices.

In various embodiments, the substitution right may initially lie with the investor 10, but may switch to the firm 16 under certain circumstances, for example, when the performance, or return, of the swap portfolio exceeds a benchmark index. Terms for determining the benchmark index may be set forth in an underlying contract, for example, the swap contract. The benchmark index may be computed based on the underlying transaction and subsidiary transactions. For example, the benchmark index may be based on the performance of a notional investment in a select portfolio. The names included in the notional investment and the relative units of each may be determined by a computer system, for example, as described below. The notional investment may reflect the return of one or more proprietary trading positions of the firm 16. Accordingly, the return of the swap portfolio may track the return of the firm's 16 proprietary trading positions, giving the investor 10 the benefit of the firm's proprietary positions without requiring the firm 16 to disclose those positions. In various embodiments, the firm 16 and/or the investor 10 may manipulate the substitution right to make the swap portfolio perform similar to another name or group of names.

The swap contract may have a term similar to that described above, and may also be unwound at any time during the term by the investor 10 with sufficient notice. Also, as illustrated in FIG. 2, the investor 10 may terminate its initial long position with respect to one or more names in the long portfolio and take a long position on one or more new names. Again, any changes in the long position of the investor 10 may be communicated to the firm 16 to make sure that none of the names of the investor's long positions are also included in the short swap portfolio.

Again, at termination of the swaps, as illustrated in FIG. 3, due either to expiration of the term of the swaps or early termination by the investor 10, the swap contracts may be cash-settled between the investor 10 and the firm 16 based on the current value of the underlying securities, and the long positions may be neutralized, i.e. by the investor 10 selling the names into the market 20.

Figure 4:
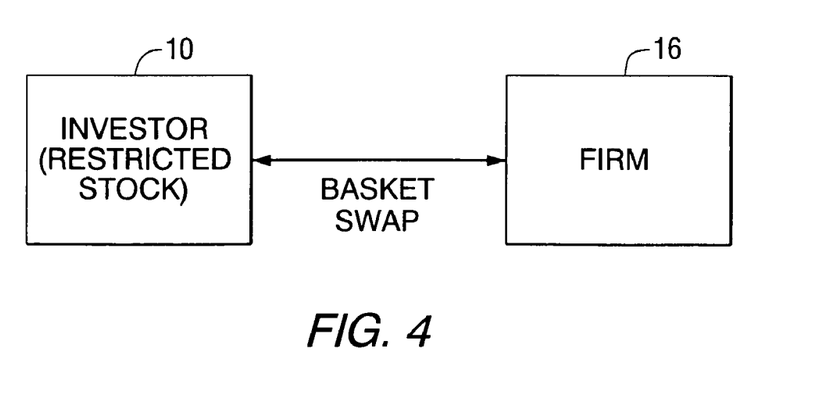
FIGS. 4-5 illustrate a transaction structure according to another embodiment of the present invention.
Figure 5:
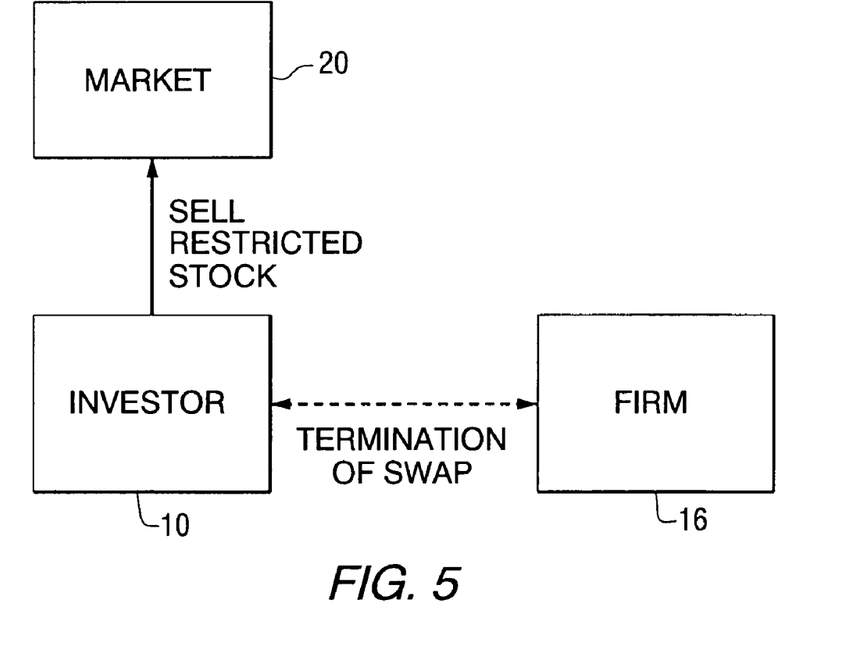

FIGS. 4 and 5 illustrate another investment trading structure according to various embodiments of the present invention. In this embodiment, the investor 10 may hold a restricted security, i.e., a security that the investor 10 is temporarily restricted from selling or otherwise transferring. Under this trading strategy, the investor 10 may enter into a short swap agreement (a "basket swap") on up to a number (such as twenty) different underlying securities with the firm 16. As before, the firm 16 may substitute the underlying securities in the basket swap at its own discretion, except that at no time may any of the securities comprising the basket swap correspond to the restricted stock of the investor 10. In exchange for this right, the firm 16 agrees to pay an enhanced rate leg to the investor 10 on the basket swap of, for example, an interest rate index (e.g., LIBOR, Fed. Funds, etc.) plus some spread (e.g., 100 bps, 150 bps, etc.). The firm may exercise its ability to substitute underlying names on the basket swap to, for example, achieve the trading goals mentioned above in connection with the transaction structure of FIGS. 6-7. In addition, the investor 10 may benefit from the transaction structure as explained above. The value of the substituted position in the basket swap should be equal to the position for which it is substituted. As before, the value of the position may be based on the price of the underlying securities.

The term of the basket swap may be, for example, a number of years (e.g. one year, five years, etc.), but the investor 10 could unwind the transaction at fair market value at any time during the term as long as sufficient notice is provided. In addition, the firm 16 may have the right to terminate the swap, for example, because of loss of hedge or other market disruptions.

At the termination of the transaction, as illustrated in FIG. 5, the basket swap may be cash-settled between the firm 16 and the investor 10, and the investor 10 may sell the restricted stock into the market 20.

Again, the transaction structure's performance could be monitored daily, for example, by a computer system (as explained further below), and, by virtue of the liquidity of the long stocks and the investor's ability to early terminate the swap contracts, the trading strategy's risk could be eliminated quickly in scenarios where the strategy in not performing as anticipated.

Figure 6:
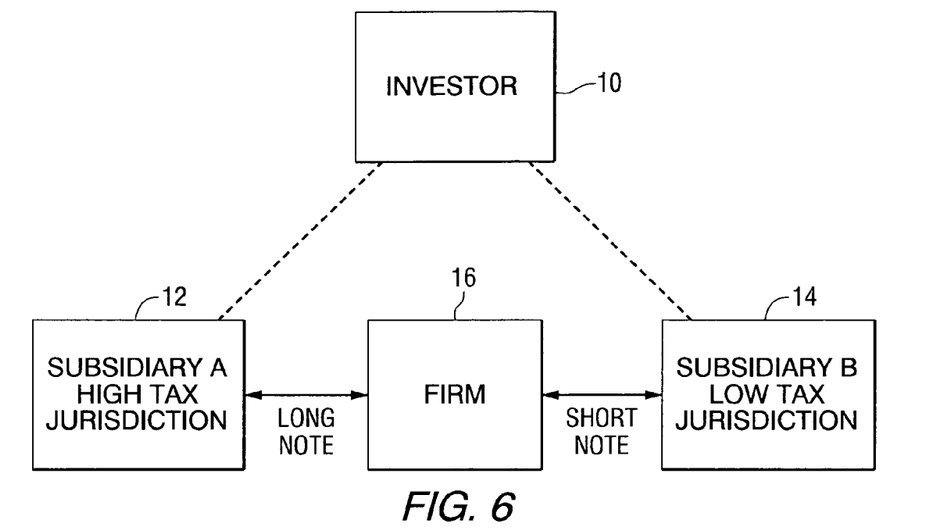
FIGS. 6-7 illustrate a transaction structure according to yet another embodiment of the present invention.

FIG. 6 is a diagram of an investment transaction structure according to various other embodiments of the present invention. In the illustrated transaction structure, an investor 10, such as an institutional investor, may have a first subsidiary 12, Subsidiary A, in a high tax jurisdiction and a second subsidiary 14, Subsidiary B, in a low tax jurisdiction. For example, Subsidiary A may be located, for tax purposes, in a jurisdiction with an effective tax rate of 30% and Subsidiary B may be located, for tax purposes, in a jurisdiction with an effective tax rate of 0%. Both subsidiaries may be 100% owned by the investor 10.

In the transaction structure, Subsidiary A may buy a long note from a firm 16 for a sum, $X. The firm 16 may be, for example, a brokerage firm or an investment bank. The long note may provide Subsidiary A with exposure to a series of notional long and short positions in stock for $X. The long note may track the performance of a series of long and short equity notional positions. That is, for example, the value of a long note tracking a particular series of notional positions may increase based on the appreciation of the set of equities in that series and decrease in value based on the depreciation of those of equities. For a note tracking another series of notional positions, the long note may decrease in value for appreciation of the set of equities in that series and increase in value for depreciation of those equities. The term of the note may be, for example, a number of days, a number of months, a number of years, etc. That value of the underlying equity positions may be equal to $X at the start of the term.

In addition, Subsidiary B may buy a short note from the firm 16 for a fraction, a, of the cost of the long note. That is, the short note may cost $aX. The short note may track the performance of the same set of equities in the long note, except in an inverse relationship, meaning that if the long note increases in value based on the appreciation of an equity, the short note will decrease in value based on appreciation of the equity. In other words, the short note may have the same notional positions—in the same relative proportions—as the long note, but at a scaled factor, a, of the long note. The term of the short note may be equal to the term of the long note.

The value of a may be related to the relative tax rates of the two jurisdictions. For example, a may be computed as follows:

$$a = \frac{1 - HT\ \%}{1 - LT\ \%}$$

where HT % is the effective tax rate in the high tax jurisdiction and LT % is the effective rate in the low tax jurisdiction. For example, if the cost of the long note is $200 mm, the HT %=30% and the LT=0%, the short note may cost:

$$\$200\ mm \times \frac{1 - 30\%}{1 - 0\%} = \$140\ mm$$

Figure 7:
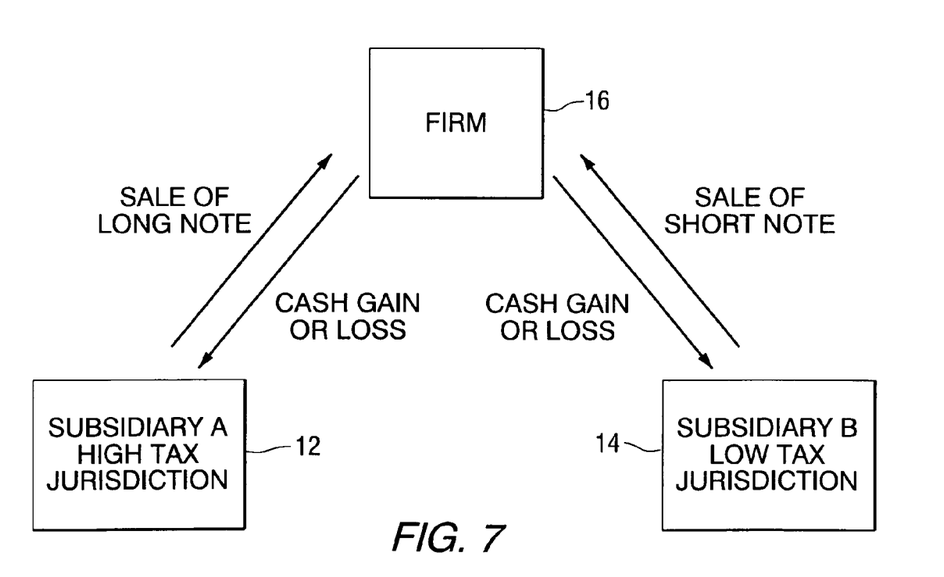

As a result of the different tax rates, the investor 10 has no net exposure to the notional positions on an after-tax basis. As illustrated in FIG. 7, the transaction will result in a gain for one entity and loss for the other entity, assuming prices have changed. The gain and loss will net to zero on an after-tax basis, as either (i) the after tax gain in the high tax jurisdiction will be offset by an equal loss in the low tax jurisdiction, or (ii) the after tax loss in the high tax jurisdiction will be offset by an equal gain in the low tax jurisdiction.

Both notes may have a stated maturity term of, for example, one year. In addition, the notes may be put at any time during their term, with sufficient notice, thereby unwinding the transaction. The notice requirement for unwinding the transaction may be, for example, fourteen trading days.

In addition, the notes may stipulate that the firm 16 has the sole discretion to substitute components of the notional positions—on either the long or short note, or both. For example, if the underlying security for a notional position of the short note is IBM, the firm 16, at its sole discretion, could substitute another security, such as Microsoft (MSFT), for the notional position of the short note. In exchange for this entitlement, the firm 16 may pay a yield corresponding to an interest rate index plus some spread on each note. For example, the firm 16 may pay some rate index, e.g., the LIBOR or the Fed Funds rate, plus some spread, such as for example, 100 basis points (bps), 150 bps, etc. The maturity payment on the notes may depend on the performance of the notional positions. Preferably, however, the interest payments on the notes may be based on the face value of the notes, i.e., the value of the notes at inception, and, as such, fixed and not subject to variations in the principal amount.

The substitution may be done for both the long and short notes to maintain the symmetry between the positions of the notes. That is, for example, a substitution, such as MSFT for IBM, could be made for each note. In addition, the substitution for each note preferably should be of equal value at the time of substitution as determined based upon market prices. To maintain the relationship in the values of the notes, the value of the substitution of the short note should be a fraction, a, of the value of the substitution of the long note. Depending on the time the substitution is made or other considerations, such as legal rules or risk reduction, the value of the underlying names/securities for the substitutions may be computed based on, for example, the closing price on the day of the substitution, particular prices during the trading day, an average of prices over the trading day, such as a value-weighted average price, or some other price. The substitutions by the firm 16 may be disclosed to the investor 10, for example, either as substitutions are made during the day or at or around the close of a trading day if substitutions are made at the close of the trading day.

In order to effectuate its right to substitute positions, according to various embodiments, the firm 16 may supply on each trading day, by a communications network, for example, a list of long and short positions (e.g., twenty of each) chosen in its sole discretion, which comprise the notional positions of the long and short notes, respectively. The firm 16 may choose the positions to limit its risk or create the possibility of trading profits for itself. The components of the notional positions may be, for example, U.S. stocks, such as constituent stocks of the S&P 500. At the inception of the notes, a mean return of zero for the notional positions over the term of the notes may be expected, with a daily standard deviation of approximately 2%. The expectation of performance may be subject to change over the term of the notes, in line with any changes made in the notional positions and general market conditions, or for other reasons. This need not affect the coupon under the notes, which is set at inception.

The notional positions and note performance may be subject to ongoing restrictions. For example, a maximum decline threshold, such as, for example, 30%, may be set for the notes; that is, notwithstanding any movement in value of the positions, payment on maturity of the note would never be less than the threshold. In addition, the investor 10 may choose to unwind the notes at any time during the term, subject to appropriate notice.

The ability of the firm 16 to substitute notional positions may enable the firm 16 to cause the value of the derivative or payment obligations to reflect the financial return of securities not included in the notional positions. The ability to switch the notional positions allows the performance on the contract to correspond to the performance of assets or strategies that are not reflected in the underlying stocks of the notes. This may allow, for example, the firm 16 to use the contracts/notes to hedge positions on its books that it cannot disclose because knowledge of those positions could adversely affect the firm's trading position in the market. In this way, the firm 16 can allow its clients, such as the investor 10, to participate in the transaction without adversely affecting the firm's trading position in the market. In addition, the trading structure may be advantageous to the investor 10 in allowing the investor 10 to achieve investing goals related to, for example, regulatory or contractual requirements, or other benefits arising because of a difference between the notional positions and the overall performance of the note/contract.

Figure 8:
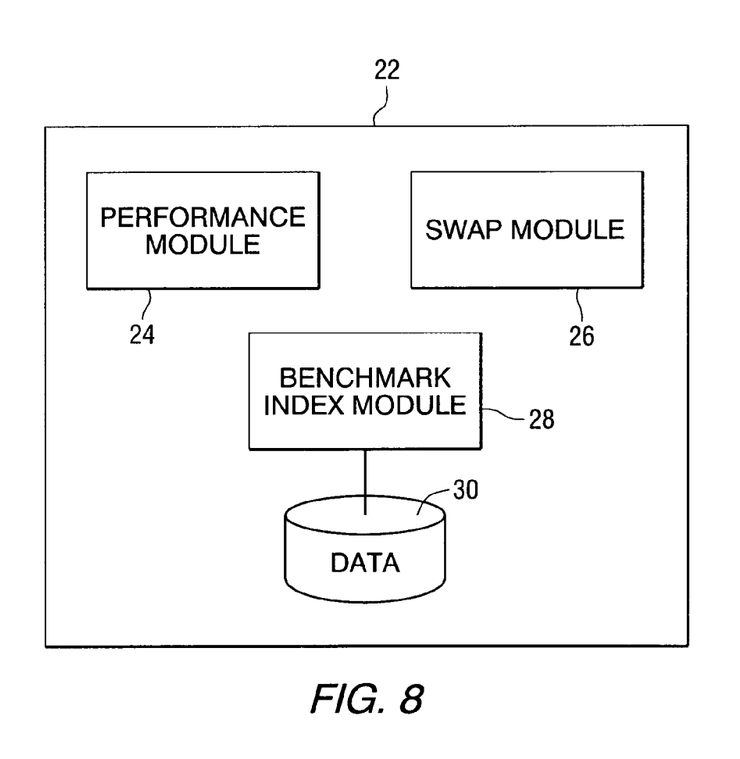
FIG. 8 illustrates a computer system according to various embodiments of the present invention.

FIG. 8 illustrates a computer system 22 for facilitating transaction structures according to various embodiments of the present invention. The computer system 22 may include one or more networked computer devices, and may implement various functional modules, for example, a performance module 24, a swap module 26, and a benchmark index module 28, as discussed in more detail below. The various modules may be implemented as software code to be executed by a processor(s) of a computing device (not shown) of the computer system 22 using any type of suitable computer instruction type, such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium, such as a hard drive or floppy disk, an optical medium such as a CD or DVD-ROM or a flash memory card.

The performance module 24 may monitor the performance or return on a name or series of names. For example, the performance module 24 may monitor names currently included in the various notes and/or swap contracts, as well as names that may be potentially substituted into a note and/or swap contract. For example, the performance module 24 may monitor the price of the names included in notes and/or swaps of the present invention, allowing the notes and/or swaps themselves to be valued. The performance module 24 may receive input data for each name of interest, including, for example, long and short term trading patterns for the names, correlations between the names and other names being monitored. In various embodiments, input data may be received from the market or any other suitable source and may be stored in database 30. This monitoring may be used as an aid to, for example, determine which securities should be substituted in the various swap contracts and/or notes.

In various embodiments, the swap module 26 may select names for inclusion in one or more notes and/or swap contracts based on the criteria set forth herein. For example, the names may be selected generally for the profit of the party holding the substitution right, e.g., the firm 16 or investor 10. Also, the names may be selected to cause the note or swap contract to behave in manner similar to that of another portfolio of names, for example, a proprietary trading position of the firm 16, as discussed above. In various other embodiments, the names may be selected to effectively hedge an outside position taken by the party holding the right of substitution.

In various embodiments, the benchmark index module 28 may be used to calculate a benchmark index, for example, based on the performance of a notional investment in a select portfolio as described above. The benchmark index module 28 may select the names and the number of units/shares of each name to be included in the select portfolio. The select portfolio may represent a proprietary trading position of the firm. The benchmark index module 28 may also perform calculations to derive the benchmark index, for example, based on the performance of the select portfolio.

Derivative transactions have been described herein in the context of swap contracts and notes. It will be appreciated that the methods of the present disclosure may be practiced with any kind of derivative contract whose value depends on the value of an underlying security including, for example, a swap, a credit swap, an option, a credit option, a put option, a call option, a credit-linked note, a total return swap, a default swap, an exotic option, an exotic credit option, a swaption or a swap option, a total rate of return swap, a loan swap, a credit swap, or any other instrument which can be utilized as a derivative.

While several embodiments of the invention have been described, it should be apparent, however, that various modifications, alterations and adaptations to those embodiments may occur to persons skilled in the art with the attainment of some or all of the advantages of the present invention. For example, some transactions described herein may be executed as a single transaction or a series of individual transactions. It is therefore intended to cover all such modifications, alterations and adaptations without departing from the scope and spirit of the present invention as defined by the appended claims.

What is claimed is:

1. A computer system for facilitating transactions between a first party and a second party, the computer system comprising:
   an electronic memory device; and
   an electronic processor in communication with the memory device, wherein the memory device comprises instructions that when executed by the processor cause the processor to:

receive an indication of a derivative portfolio indicating one or more securities on which the first party is long and the second party is short;

receive an indication of a long portfolio of securities on which the second party holds a long position, wherein the long portfolio and the derivative portfolio do not have any securities in common;

determine whether a right to substitute securities from the derivative portfolio resides with the first party or the second party;

conditioned on the right to substitute residing with the first party, substitute a first security from the derivative portfolio for an equal value of a second security in response to an instruction originated by the first party;

conditioned on the right to substitute residing with the second party, substitute a third security from the derivative portfolio for an equal value of a fourth security in response to an instruction originated by the second party.

2. The computer system of claim 1, wherein the memory device further comprises instructions that when executed by the processor cause the processor to determine a first payment from the first party to the second party wherein determining the first payment comprises multiplying a predetermined interest rate by a notional value of the derivative portfolio.

3. The computer system of claim 2, wherein the predetermined interest rate is an index rate plus a spread.

4. The computer system of claim 1, wherein a notional position of the derivative portfolio is less than a notional position of the long portfolio by a predetermined percentage.

5. The computer system of claim 1, wherein determining whether the right to substitute securities from the derivative portfolio resides with the first party or the second party comprises:

setting the right to substitute with the second party; and conditioned upon the occurrence of a predetermined event, switching the right to substitute to the first party.

6. The computer system of claim 5, wherein the memory device further comprises instructions that when executed by the processor cause the processor to calculate a benchmark index, and wherein the predetermined event occurs when the performance of the derivative portfolio exceeds the benchmark index.

7. The computer system of claim 1, wherein the memory device further comprises instructions that when executed by the processor cause the processor to determine values of the first security and the second security based on Volume Weighted Average Prices of the respective securities.

8. The computer system of claim 1, wherein the long portfolio comprises a restricted security and wherein the derivative portfolio does not include the restricted security.

9. A computer-implemented method for facilitating transactions between a first party and a second party, the method comprising:

receiving by a computer an indication of a derivative portfolio indicating one or more securities on which the first party is long and the second party is short, wherein the computer comprises an electronic memory device and an electronic processor in communication with the memory device;

receiving by the computer an indication of a long portfolio of securities on which the second party holds a long position, wherein the long portfolio and the derivative portfolio do not have any securities in common;

determining by the computer whether a right to substitute securities from the derivative portfolio resides with the first party or the second party;

conditioned on the right to substitute residing with the first party, substituting a first security from the derivative portfolio for an equal value of a second security by the computer in response to an instruction originated by the first party;

conditioned on the right to substitute residing with the second party, substituting a third security from the derivative portfolio for an equal value of a fourth security by the computer in response to an instruction originated by the second party.

10. The method of claim 9, further comprising determining a first payment from the first party to the second party wherein determining the first payment comprises multiplying a predetermined interest rate by a notional value of the derivative portfolio.

11. The method of claim 10, wherein the predetermined interest rate is an index rate plus a spread.

12. The method of claim 9, wherein a notional position of the derivative portfolio is less than a notional position of the long portfolio by a predetermined percentage.

13. The method of claim 9, wherein determining whether the right to substitute securities from the derivative portfolio resides with the first party or the second party comprises:

setting the right to substitute with the second party; and conditioned upon the occurrence of a predetermined event, switching the right to substitute to the first party.

14. The method of claim 13, further comprising calculating a benchmark index, and wherein the predetermined event occurs when the performance of the derivative portfolio exceeds the benchmark index.

15. The method of claim 9, further comprising determining values of the first security and the second security based on Volume Weighted Average Prices of the respective securities.

16. The method of claim 9, wherein the long portfolio comprises a restricted security and wherein the derivative portfolio does not include the restricted security.

* * * * *